Nov. 13, 1951 — A. F. HICKMAN — 2,574,478
OIL SEAL FOR BEARINGS
Filed Aug. 9, 1946 — 2 SHEETS—SHEET 1
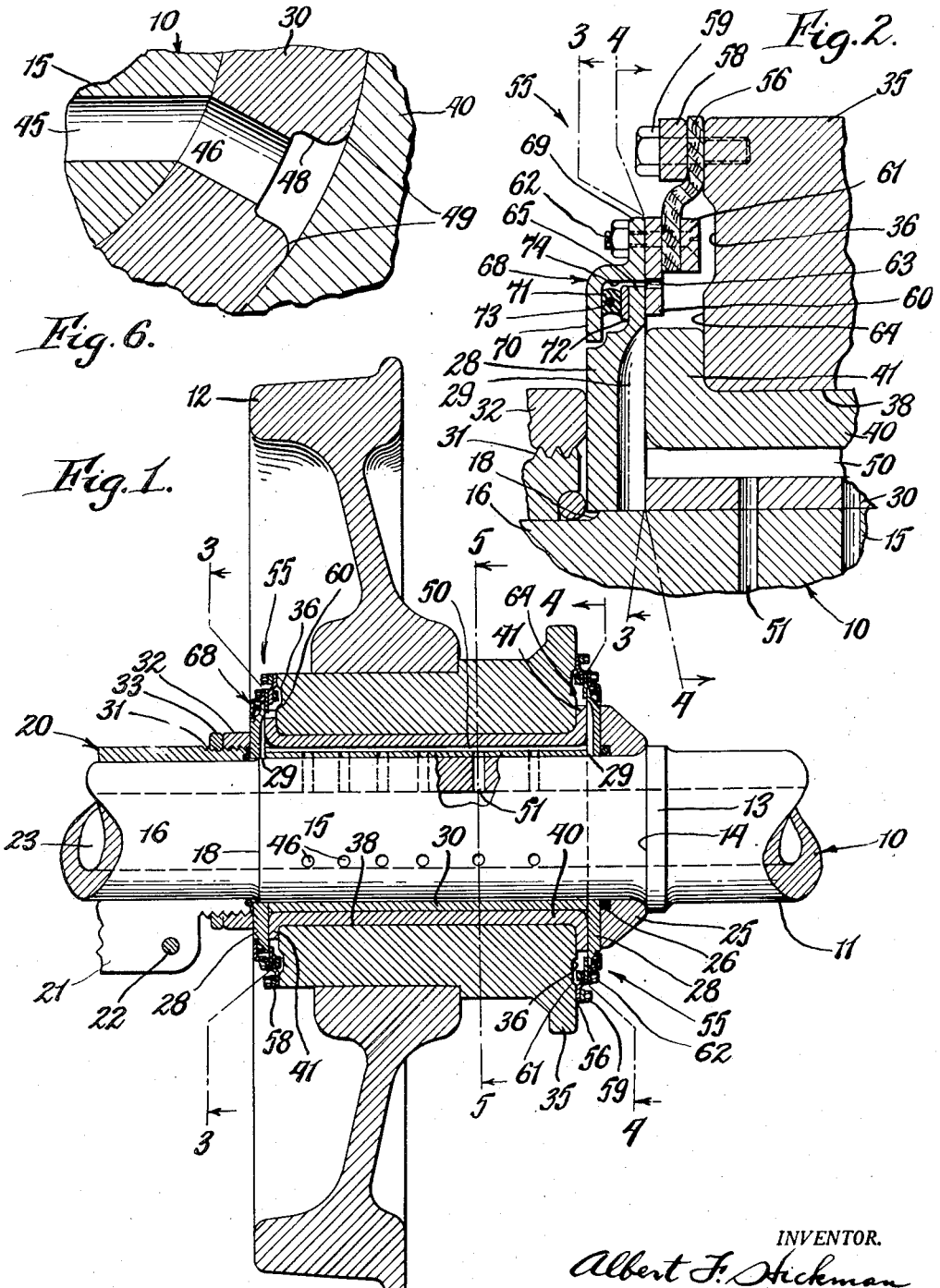

Patented Nov. 13, 1951

2,574,478

UNITED STATES PATENT OFFICE 2,574,478

OIL SEAL FOR BEARINGS

Albert F. Hickman, Eden, N. Y., assignor to Hickman Industries, Inc., Eden, N. Y., a corporation of New York Application August 9, 1946, Serial No. 689,365

2 Claims. (Cl. 286—11)

This invention relates to an oil seal for bearings and more particularly to an oil seal for a high speed friction bearing assembly such as the axle and wheel assembly for high speed railroad cars having a non-rotating axle supported on independently rotating railroad car wheels described in my copending application for Frictional Bearing Assembly, Serial No. 674,489, filed June 5, 1946, now Patent No. 2,527,551 issued October 31, 1950, and of which this application is a continuation in part.

One of the objects of the invention is to provide an oil seal which will operate at high efficiency to prevent the escape of oil from a bearing regardless of the condition of wear of the bearing.

Another object is to provide such an oil seal which is itself adequately lubricated to prevent the development of friction between its contacting parts.

Another object is to provide such an oil seal against which the oil can be impressed at relatively high pressure without danger of escape of such high pressure oil.

Another object is to provide such an oil seal which is adequately protected from dust and dirt and which protects the bearing from dust and dirt.

Another aim is to provide such an oil seal which is positive in its sealing action.

Another aim is to provide such an oil seal which is flexible in adapting itself to changing conditions particularly radial or thrust wear of the bearings and which will maintain such flexibility for a long period of time to operate at full efficiency for a long time.

Another aim is to provide such an oil seal in which extremely close tolerances do not have to be provided, the oil seal being sufficiently flexible to adapt itself to slightly warped or undulating conditions.

Another purpose is to provide such an oil seal which will retain a constant contact position even after pronounced bearing wear so that bearing wear will not affect performance of the oil seal.

Another object is to provide such an oil seal which is low in cost, readily accessible for inspection, replacement and repair and which is particularly adapted for outside service, such as in conjunction with railroad car wheels.

Other objects and advantages will appear from the following description and drawings in which:

Fig. 1 is a vertical longitudinal section, partly in elevation, of a non-rotating railroad car axle supported on a railroad car wheel by a friction bearing having oil seals in accordance with the present invention.

Fig. 2 is an enlarged fragmentary view similar to Fig. 1, and showing one side of the oil seal in section.

Figure 3:
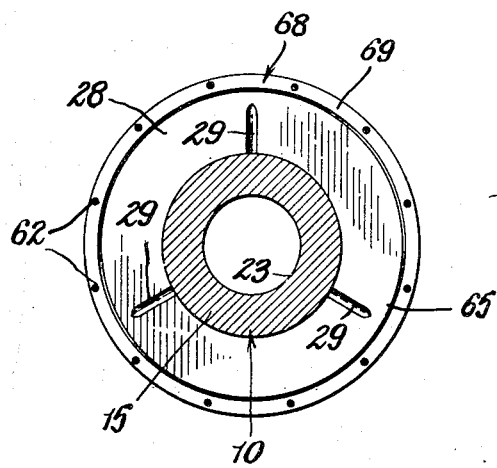
Figure 4:
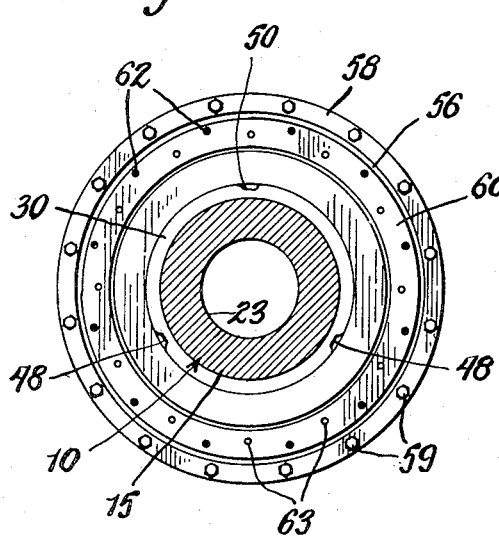
Figure 5:
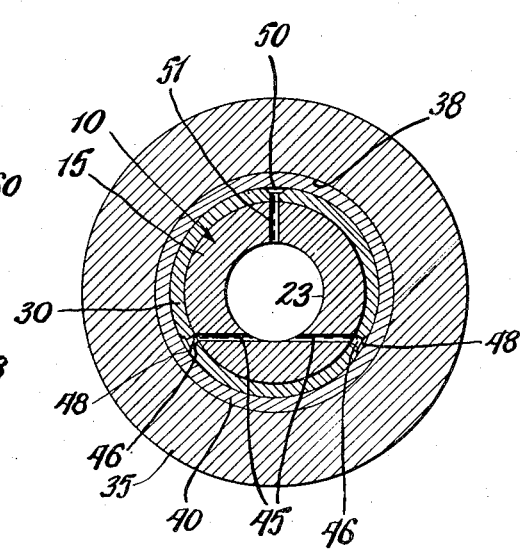

Figs. 3, 4 and 5 are vertical cross sectional views taken on the correspondingly numbered lines on Fig. 1, the lines 3—3 and 4—4 also being indicated on Fig. 2.

Fig. 6 is a greatly enlarged section, similar to Fig. 5, and particularly showing the cross sectional shape of the axle oil grooves.

The invention is illustrated in conjunction with a non-rotating railroad car axle, indicated generally at 10, and which in other installations would be a non-rotating shaft, and this axle is shown as having a central enlarged part 11 between the flanged car wheels 12 and as having an enlarged annular rim 13 immediately inside of each wheel 12 and which forms an outwardly facing shoulder 14; a reduced cylindrical load bearing portion 15 extending outwardly from this shoulder and which is supported directly by the wheel 12; and a reduced cylindrical extremity 16, an outwardly facing annular shoulder 18 being provided between the reduced extremity 16 and the bearing portion 15 of the axle.

The axle is designed to be connected with the truck or car frame (not shown) by the spring suspension forming the subject of my copending application Serial No. 618,917 filed September 27, 1945, now Patent No. 2,553,583, for Spring Suspension for Railroad Cars and to this end is shown as having an axle bracket 20 secured to each projecting end of the axle and having a split tubular base or clamping portion 21 which embraces the reduced extremity 16 of the axle and is clamped thereto by a plurality of bolts 22. The details of the spring suspension form no part of the present invention and hence are not shown, reference being made to my said spring suspension patent application for a detailed description thereof.

The axle forms a reservoir for a body of oil supplied to the friction bearings of the car wheels 12 and to this end is provided with an axial bore 23 the opposite ends of which are closed in any suitable manner (not shown).

A thrust collar or ring 25 is tightly fitted on the load bearing cylindrical part 15 of the axle and against the shoulder 14 formed by the annular rim 13 and this thrust collar or ring 25 has a flat thrust face opposing the car wheel 12 and arranged in a plane perpendicular to the axis of the axle. At the inner margin of this flat thrust face an annular recess is provided which surrounds the axle and receives a packing ring 26 to prevent oil leakage between the thrust ring 25 and the axle. Against the flat thrust face of the thrust ring 25 is fitted a flat sided thrust disk 28 which fits around the load bearing cylindrical part 15 of the axle and is provided, on its face opposing the car wheel 12, with a plurality of radial oil grooves 29 which extend from the inner margin of this thrust ring to a point short of the outer margin thereof, as best shown in Figs. 2 and 3. Three of such radial oil grooves are shown, one extending vertically and the other two extending downwardly and outwardly.

A cylindrical steel sleeve 30 is tightly fitted on the load bearing cylindrical part 15 of the axle against the thrust disk 28 and the opposite end of this steel sleeve is engaged by a second thrust disk 28 having similar radial oil grooves 29 opposing the car wheel 12.

To hold these non-rotating parts of the bearing in position, the inner extremity of the tubular base or clamping portion 21 of the axle bracket 20 is threaded, as indicated at 31, and on this threaded part is screwed a threaded thrust ring 32 and threaded locking ring 33. These threaded rings 32 and 33 are tightened against the adjacent thrust disk 28 thereby to hold these thrust disks 28, steel sleeve 30 and end thrust ring or collar 25 securely in engagement with the axle shoulder 14 and in engagement with each other. These non-rotating parts of the bearing are thereby secured to the axle and secured in proper position with reference to one another.

The car wheel 12 is shown as having a tubular hub 35 on which it is tightly fitted, this hub having a relatively shallow annular recess 36 in each of its end faces and concentric with its bore 38. The bearing is shown as having babbitt 40 poured between the bore 38 of the hub and the steel sleeve 30 and also poured against the end faces of the hub 35 thereby to provide annular thrust parts or flanges 41 at opposite ends of the babbitt bearing and which engage the opposing thrust faces of the two thrust disks 28. It will therefore be seen that the babbitt provides a radial friction bearing face engaging the steel sleeve 30 and also axial or thrust friction bearing faces engaging the two thrust disks 28. This babbitt 40, together with its thrust flanges or ends 41 can also be made of bronze in two sections. In such event the break between the two sections should be as close to the right hand end thereof, as viewed in Fig. 1, so as to be remote from the load bearing end of the bearing where high oil pressures develop.

To oil this bearing the cylindrical bearing portion 15 of the axle is provided with a series of holes or ducts 45 which are shown as arranged in a generally horizontal plane intersecting the lower part or bottom of the oil reservoir 23 in the axle. These holes or ducts 45 extend from the oil reservoir 23 to the exterior face of the cylindrical bearing portion 15 of the axle and each communicates with a port 46 through the steel sleeve 30. The series of ports 46 on each side of the bearing are connected by an oil groove 48 in the inner face of the steel sleeve 30, these grooves 48 extending the full length of the steel sleeve 30 and each communicating at its opposite ends with the corresponding radial grooves 29 of the two end thrust disks 28, as best shown in Figs. 4 and 5.

It will be noted, from Fig. 6, that these oil grooves 48 are of special cross sectional shape. While the bottoms and sides of these grooves can be of any form, it is important that at least the lower edges thereof be beveled so as to each provide a V-shaped or tapering crevice 49 which points or diminishes toward the bottom of the bearing. This tapering crevice can be provided by either a flat bevel or a rounding bevel, as shown, on the lower edge of each groove 48 and can be provided, as shown, on both edges of each of these grooves. The apex of each crevice, formed by the bevel of each groove 48 and the bore of the babbitt 40 must, however, be of sufficient fineness to cause a wedging or congestion of the molecules of oil therein when the babbitt 40 turns on the steel sleeve 30. Since such V-shaped crevices are provided at at least the bottom edge of each groove 48 it will be seen that when the car wheel 12 is rotated in either direction oil will be wedged or crowded from the groove 48 at the downwardly traveling side of the babbitt 40 between this babbitt and the steel sleeve 30, thereby to insure a film of oil at all times between the underside of the steel sleeve 30 and the babbitt 40.

The steel sleeve 30 is provided with a longitudinal groove 50 at its apex, this groove extending the full length of the steel sleeve and communicating at its opposite ends with two of the radial grooves 29 of the two thrust disks 28. This groove 50 is shown as being of the same cross sectional shape as the grooves 48 but its cross sectional shape is not important as it functions as an air and oil return groove, the air and oil collecting in this groove passing through a vertical duct 51 extending from the bottom of the groove 50 through the steel sleeve 30 and axle 10 to the axle reservoir 23.

The present invention is particularly directed to the oil and duct seal, indicated generally at 55, provided at opposite ends of the bearing to prevent the escape of oil and the ingress of dust and other foreign matter. The oil seal at one end of the bearing is the same as the oil seal provided at the opposite end of the bearing and hence the same description applies to both. As best shown in Figs. 2 and 4, a ring 56 of leather or other flexible material is secured to each end face of the hub 35 of the car wheel concentric with its axis and immediately outside of the annular groove or recess 36. The outer part of this leather ring 56 is shown as secured to the car wheel hub by a metal clamping ring 58 and a plurality of screws 59, these screws extending through the clamping ring 58 and leather ring 56 and being sufficiently closely spaced to insure against the leakage of oil or the ingress of dust between the leather ring 56 and the car wheel hub 35.

Each leather ring 56 extends inwardly over the corresponding recess 36 and its inner part is clamped between two metal rings 60 and 61 by an annular series of bolts 62. The inner ring 61 is relatively narrow and is merely a retaining or backing ring, the corresponding annular recess or groove 36 being provided to insure free movement of this ring. The outer ring 60, however, extends inwardly from the leather ring 56 and has face engagement with the inner radial face of the corresponding thrust disk 28. This ring 60 also is provided with an annular series of oil holes 63 extending therethrough and leading from the chamber 64 formed by the leather ring 56 and slip ring 60 to points just beyond the periphery of the thrust disk 28.

The peripheral extremity or rim 65 of each thrust disk 28 is of reduced thickness and this rim 65 is embraced by ring 68 having a base portion 69 secured to the outer face of the slip ring 60 by the bolts 62 and an outwardly offset portion 70 which is L-shaped in cross section and extends around the reduced rim 65 of the corresponding thrust disk 28. A ring 71 of rubber is vulcanized to the inner face of the offset 70 of this ring 68 and a metal slip ring 72 is vulcanized to the opposite face of this rubber ring 71. This metal slip ring 72 is thin in cross section so as to be capable of adapting itself to the contacted surface of the rim 65 of the thrust disk 28 even though this rim is slightly warped or undulating in an axial direction. This rubber ring 71 is shown as provided with a metal ring 73 as a core and is normally under compression to hold the slip ring in firm contact with the outer radial face of the rim 65 of the corresponding thrust disk 28. It will be noted that each rubber ring 71 is of radially outwardly bowed or arched form in cross section. By this form any oil pressures which may develop in the chamber 74 provided by the ring 65, rubber ring 71 and its slip ring 72 merely serve to press the slip ring 72 into firmer engagement with the rim 65 of the thrust disk 28.

In the operation of the invention, the oil in the reservoir 23 fills the holes or ducts 45, ports 46 and oil grooves 48 on opposite sides of the axle. Assuming the car wheel 12 and its hub 35 to be rotating clockwise, as viewed in Figs. 5 and 6, it will be seen that the oil in the lower V-shaped crevice 49 of the right hand oil groove 48 is subjected to a molecular congestion or wedging in the downwardly pointed or downwardly converging apex of this V-shaped crevice and hence is continuously forced or pumped between the underside of the steel sleeve 30 and the babbitt 40 to provide a constantly replenished film of oil under the steel sleeve on which the axle floats. This film of oil rotates with the car wheel and since it is constantly being replenished there is no danger of metal to metal contact between the periphery of the babbitt 40 and the steel sleeve 30. It will also be seen that with a reverse rotation of the car wheel 12, as viewed in Figs. 5 and 6, the opposite or left hand oil groove 48 becomes effective to provide this constant replenishment of the film of oil under the steel sleeve 30.

This oil from the two grooves 48 also flows out of the ends of these grooves into the radial grooves 29 of the thrust disks, these grooves 48 and 29 being in end communication with each other as best shown in Figs. 3 and 4. These lower radial grooves 29 of the two thrust plates thereby supply oil between the thrust bearing faces of the thrust disks 28 and the end flanges 41 of the babbitt 40 as well as to supply oil to the annular chamber 64 provided by the corresponding thrust disk 28, slip ring 60 and leather ring 56 at each end of the bearing.

The oil entering this chamber 64 maintains the softness of leather ring 56 and also prevents friction between the slip ring 60 attached thereto and the inner radial face of the corresponding thrust disk 28. A part of this oil also passes through the oil holes 63 into the chamber 74 provided by the offset ring 68, rubber ring 71 and slip ring 72. This oil lubricates and prevents friction between this slip ring 72 and the outer radial face of the corresponding thrust disk 28.

This slip ring 72 is yieldingly held in firm engagement with this outer radial face of the corresponding thrust disk 28 by the normal compression of the rubber ring 71 which is vulcanized both to this slip ring 72 and the offset 70 of the ring 68. By virtue of the radially outwardly arching cross sectional form of the rubber ring 71 any oil pressure developing in the chamber 74 acts to flatten the arch of the rubber ring 71 and hence to press the slip ring 72 into firmer engagement with the rim 65 of the thrust disk 28. It will be seen that the oil seal is provided by the two slip rings 60 and 72 engaging opposite radial faces of the reduced rim 65 of the corresponding thrust disk 28 and that these slip rings are biased by the compression of the rubber ring 71 into firm engagement with the opposite sides of the thrust disk. It will further be seen that the leather disk 56 permits the slip rings to adapt themselves to conditions, such as bearing wear. The use of this leather ring 56 and the vulcanization of the rubber ring 71 to the parts which it connects insures against the escape of oil and the offset 70 of the ring 68 provides an adequate dust guard for the slip ring 72.

The upper oil groove 50 acts as a drain for any excess oil and also supplies oil to the oil groove 29 of each end thrust disk 28. The excess oil drains through the passage 51 back to the axle reservoir 23. This upper oil groove 50 also provides for the escape of air or other gases which are forced into the oil film by the lower oil grooves 48, this air venting through the passage 51 to the upper part of the oil reservoir 23 which itself is preferably vented.

It will be noted that it is unnecessary to provide extremely close tolerances on the outer radial face of the rim 65 of the thrust plate 28 since the thin slip ring 72, resiliently backed by the rubber ring 71 is able to warp or undulate axially sufficiently to retain sealed engagement with this face even though the rim 65 is slightly warped or out of flat. Thus, so long as the contacting surfaces between the rim 65 and thin slip ring 72 are uniformly polished, a complete oil seal is provided therebetween even though there is slight waviness in the contacting surface of the rim 65.

It will also be noted that the oil seal has automatic radial aligning characteristics, due to the cross sectional shape of the leather ring 56, and that excessive bearing wear must take place before the performance of the oil seal will be affected. Thus, the oil seal tends to retain a constant contact position and to rotate in the same path on the thrust plate 28 regardless of bearing wear so that it tends constantly to lap itself into a true fit. If the slip ring 72 were held so as to be required to change its position against the rim 65 of the thrust plate 28 with bearing wear, a full oil seal would not be retained.

From the foregoing it will be seen that the present invention provides a simple, inexpensive and trouble free oil and dust seal which will operate at full efficiency for a long period of time and under all weather conditions to prevent the escape of oil from the bearing or the ingress of dust and dirt thereto.

I claim as my invention:

1. An oil seal between a shaft and a wheel rotatable relative to said shaft, comprising an annular flange fast to said shaft and projecting radially outwardly therefrom, a ring of flexible material secured adjacent its periphery concentrically on said wheel adjacent said flange, a slip ring secured concentrically to said ring of flexible material adjacent its inner margin and engaging the radial face of said flange opposing said wheel, an imperforate annular member secured concentrically to said slip ring and extending around to embrace the opposite radial face of said flange, a slip ring engaging said opposite radial face of said flange concentric with said imperforate annular member, a ring of soft resilient flexible material bonded to the opposing faces of said second slip ring and imperforate annular member and biasing said second slip ring in axial opposition to said first slip ring to provide yielding engagement between both of said slip rings and said flange interposed therebetween, said wheel, flange, ring of flexible material and first slip ring forming a chamber housing the inner part of said first slip ring, and means supplying oil to said first slip ring, comprising a radial groove in the side of said flange opposing said wheel and terminating short of said first slip ring and communicating with said chamber housing the inner part of said first slip ring, and means supplying oil to said groove.

2. An oil seal between a shaft and a wheel rotatable relative to said shaft, comprising an annular flange fast to said shaft and projecting radially outwardly therefrom, a ring of flexible material secured adjacent its periphery concentrically on said wheel adjacent said flange, a slip ring secured concentrically to said ring of flexible material adjacent its inner margin and engaging the radial face of said flange opposing said wheel, an imperforate annular member secured concentrically to said slip ring and extending around to embrace the opposite radial face of said flange, a slip ring engaging said opposite radial face of said flange concentric with said imperforate annular member, a ring of soft resilient flexible material bonded to the opposing faces of said second slip ring and imperforate annular member and biasing said second slip ring in axial opposition to said first slip ring to provide yielding engagement between both of said slip rings and said flange interposed therebetween, said wheel, flange, ring of flexible material and first slip ring forming a chamber housing the inner part of said first slip ring, and means supplying oil to said slip rings, comprising a radial passage in said flange and communicating with the chamber housing said first slip ring, said first slip ring being provided with a port extending therethrough and providing communication between said chamber and said second slip ring, and means supplying oil to said passage.

ALBERT F. HICKMAN.

REFERENCES CITED

The following references are of record in the file of this patent:

UNITED STATES PATENTS

| Number | Name | Date |
|---|---|---|
| 1,158,719 | Reynolds | Nov. 2, 1915 |
| 1,888,957 | Longenecker | Nov. 22, 1932 |
| 2,014,932 | Hallett | Sept. 17, 1935 |
| 2,362,363 | Doede | Nov. 7, 1944 |
| 2,439,315 | Newton et al. | Apr. 6, 1948 |